United States Patent [19]

Hobbs et al.

[11] Patent Number: 6,057,947
[45] Date of Patent: May 2, 2000

[54] ENHANCED RASTER SCANNING ASSEMBLY

[75] Inventors: Philip Charles Danby Hobbs, Briarcliff Manor; Theordore G. van Kessel, Millbrook, both of N.Y.

[73] Assignee: International Business Machines Corporation, Armonk, N.Y.

[21] Appl. No.: 08/999,579

[22] Filed: Dec. 24, 1997

[51] Int. Cl.$^7$ .................................................. G02B 5/32
[52] U.S. Cl. .............................. 359/15; 359/17; 359/572; 359/196
[58] Field of Search .................. 359/15, 17, 18, 359/196, 201, 566, 572

[56] References Cited

U.S. PATENT DOCUMENTS

| | | |
|---|---|---|
| 4,938,550 | 7/1990 | Inagaki et al. ............................. 359/15 |
| 5,223,956 | 6/1993 | Kramer et al. ............................. 359/17 |
| 5,608,563 | 3/1997 | Matsumura et al. ..................... 359/201 |

Primary Examiner—Cassandra Spyrou
Assistant Examiner—Darren E. Schuberg
Attorney, Agent, or Firm—McGinn & Gibb, P.C.; Stephen C. Kaufman, Esq.

[57] ABSTRACT

An optical assembly utilizing a novel optical element. The assembly includes a tunable source of input radiation; an optical element that can receive at least a portion of the input radiation and comprises a manifold having at least two independent surfaces, in which at least a portion of each independent surface is selected from the group consisting of a reflective structure and a diffractive structure, and the independent surfaces are geometrically configured so that a portion of incident radiation to the manifold is diffracted at least twice in an angular sense that can increase a tuning sensitivity of an angular deviation of the incident radiation exiting the manifold; and, a scanner means which can accept and redirect a portion of the radiation output by the optical element for producing an illumination pattern.

18 Claims, 3 Drawing Sheets

ENHANCED RASTER SCANNING ASSEMBLY

BACKGROUND OF THE INVENTION

This invention relates to a novel optical element that is suitable for employment in an optical raster scanning assembly.

INTRODUCTION TO THE INVENTION

Raster scan assemblies suitable for document capture are known. A scan is commonly performed by utilizing a pair of moving mirrors, such as galvanometer scanners or rotating polygons; a typical combination is probably a fast rotating polygon for a line scan, and a slower galvo mirror for a frame scan. Note that rotating gratings such as hologon (i.e., holographic polygon) scanners can be used, instead of polygons. In all cases, mechanical raster scan assemblies are limited in speed, which imposes a sharp trade-off between resolution and frame rate.

SUMMARY OF THE INVENTION

Our work extends the potentialities of application and quality otherwise inchoate in presently available raster scan assemblies. In particular, our objectives include realizing a rugged, pocket-sized scanning device; solving a problem of how to deal with documents available only in hard copy, namely conveniently transforming them into electronic format; and substantially improving the trade-off between resolution and speed.

We first note, by way of contrast, that presently available commercial scanners can not adequately meet our objectives, or address or solve our problem. In general, the commercial products are useful, but they are relatively large, cumbersome, and limited. For example, high resolution scanning of a particular page may be especially tiresome, since a scan is slow and cropping is usually iterative.

We have now discovered a novel optical element, suitable for employment in an optical raster scanning assembly, which can meet the cited objectives and solve the stated problem.

The novel optical element comprises: a manifold having at least two independent surfaces, in which at least a portion of each independent surface is selected from the group consisting of a reflective structure and a diffractive structure, and the independent surfaces are geometrically configured so that a portion of incident radiation to the manifold is diffracted at least twice in an angular sense that can increase a tuning sensitivity of an angular deviation of the incident radiation exiting the manifold.

A novel optical assembly suitable for scanning, which incorporates this optical element, comprises:

(1) a tunable source of input radiation;

(2) an optical element that can receive at least a portion of the input radiation and comprises:
 a manifold having at least two independent surfaces, in which at least a portion of each independent surface is selected from the group consisting of a reflective structure and a diffractive structure, and the independent surfaces are geometrically configured so that a portion of incident radiation to the manifold is diffracted at least twice in an angular sense that can increase a tuning sensitivity of an angular deviation of the incident radiation exiting the manifold;
and (3) a scanner which can accept and redirect a portion of the radiation output by the optical element for producing an illumination pattern.

In operation, this optical assembly preferably follows novel methodology including:

(1) providing an optical element, the optical element comprising:
 a manifold having at least two independent surfaces, in which at least a portion of each independent surface is selected from the group consisting of a reflective structure and a diffractive structure, and the independent surfaces are geometrically configured so that a portion of incident radiation to the manifold is diffracted at least twice in an angular sense that can increase a tuning sensitivity of an angular deviation of the incident radiation exiting the manifold;
and (2) directing toward the optical element a tunable source of input radiation so that radiation output from the optical element can scan in angle as the source is tuned.

The novel invention, as just defined by way of its manifestation as optical element, assembly, and method, respectively, can realize significant advantages.

For example, one is now enabled to scan documents as easily as they are currently printed. We contemplate realization of a chalk brush-sized scanner, that can sell for approximately several hundreds of dollars, and which can enable one to scan any selected page area, in approximately half a second, store a hundred or so of them, so that they can be played back into a PC infrared port for OCR, printing, archival storage, or further processing.

Further advantages of the present invention may be discerned by way of its capability for instantly making a geometrically accurate electronic image of a curly document at high resolution, with instantaneous feedback for cropping and aiming, thus making the document capture task fundamentally easier, especially if the captured documents can be read out later, say using a wireless interface.

DETAILED DESCRIPTION OF THE DRAWINGS

The invention is illustrated in the accompanying drawings, in which.

DETAILED DESCRIPTION OF THE INVENTION

The invention is defined above, as genus, and the detailed description proceeds by unfolding in stages various preferred species and embodiments as these reference the novel optical element, the assembly, and the method, respectively.

The Optical Element

As summarized above, the optical element comprises a manifold having at least two independent surfaces, in which at least a portion of each independent surface is selected from the group consisting of a reflective structure (e.g., a mirror) and a diffractive structure, and the independent surfaces are geometrically configured so that a portion of incident radiation to the manifold is diffracted at least twice in an angular sense that can increase a tuning sensitivity of an angular deviation of the incident radiation exiting the manifold.

The manifold preferably comprises a moulded plastic; and preferably comprises a prism. Preferably, the prism comprises first and second independent surfaces of which preferably at least a portion of each comprises a diffractive structure. In particular, the diffractive structures preferably are plane diffractive gratings of uniform pitch. The diffractive structures may be applied to the outside of the surfaces. For the case of this prism embodiment, the two surfaces are preferably adjacent.

In general, the first surface can enable radiation to enter and leave the manifold, although alternatively, the first surface can enable radiation to enter the manifold and a second surface enables radiation to exit the manifold.

The optical element preferably further comprises a third independent surface comprising an absorptive portion.

It is contemplated that the first and second independent surfaces may not be exterior surfaces of the manifold. For example, an optical element could be constructed by a threefold operation comprising a first step of manufacturing a plastic prism; a second step comprising depositing grating structures on two faces of the plastic prism; and a third step comprising potting the plastic prism in more plastic, to produce a composite manifold with first and second independent surfaces in its interior.

The Assembly Incorporating the Optical Element

Figure 1:
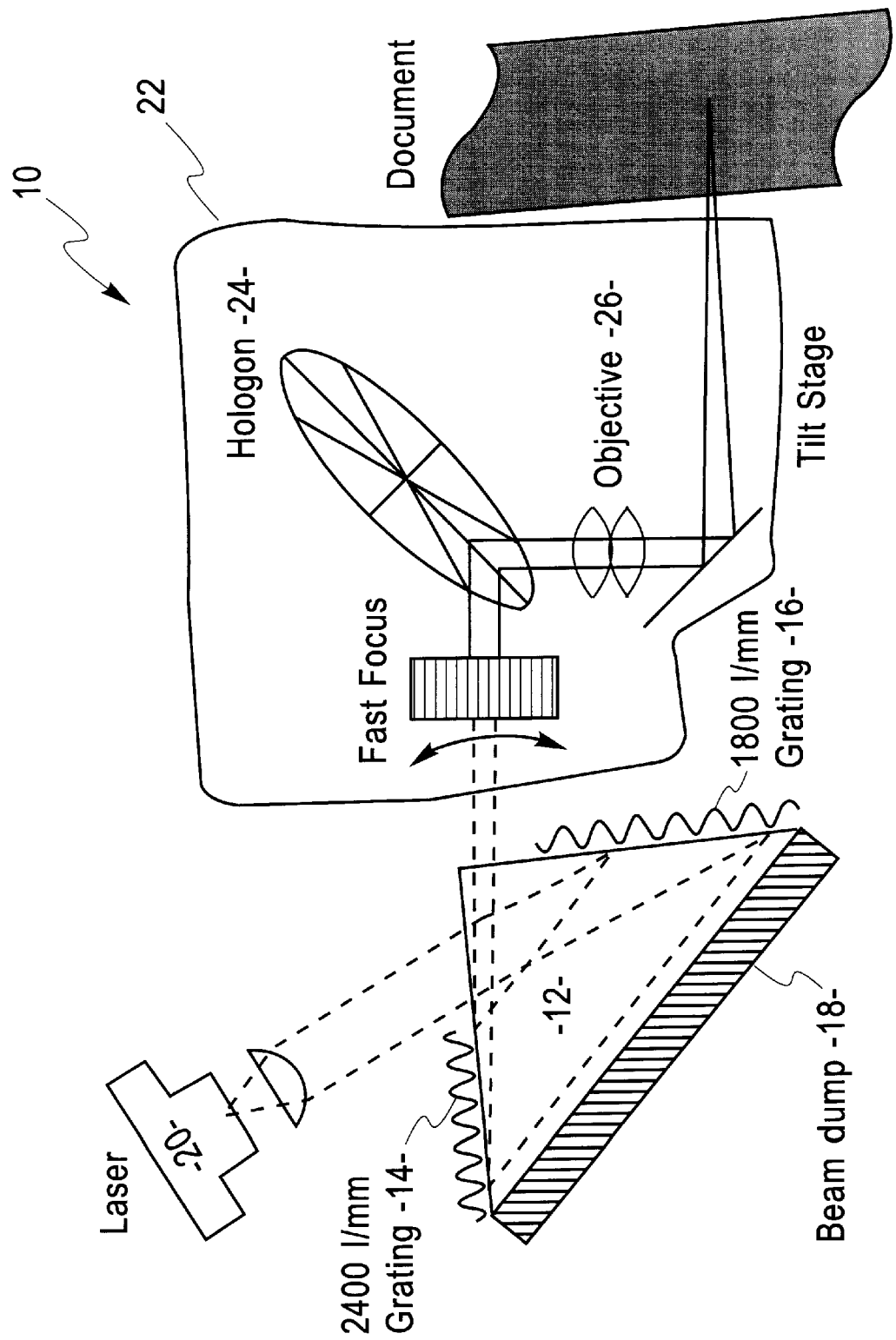
FIG. 1 shows a schematic of the invention.

Attention is now directed to FIG. 1, which shows a preferred optical assembly 10 incorporating a novel optical element 12 of a type disclosed above. In particular, the optical element 12 comprises a prism in which first and second independent surfaces 14, 16 comprise diffractive structures of uniform pitch, a third independent surface 18 comprises a beam dump, wherein the surfaces are geometrically configured so that a portion of incident radiation from a diode laser 20 may be diffracted at least twice in the same sense before exiting the optical element 12, to function as an input beam to a document scanner means 22.

Optical System Concept

The FIG. 1 optical assembly 10 preferably is based on a conventional single longitudinal mode diode laser 20 operating in a compound scan arrangement. Changing the diode laser's bias current shifts its wavelength slightly. The optical element 12 can deflect the beam through an angle that is a function of its wavelength; thus, changing the bias current can change the deflection angle. The scan range achievable with this technique depends on the dispersion of the optical element 12 and on the tuning range of the diode laser 20. Near-infrared lasers can be tuned by perhaps 1 part in $10^4$, and an optical element made of two gratings of 2400 lines/mm can produce a scan range of 2 milliradians or more (depending on the orientation of the gratings and the beam). This technique is not as easy to use with visible diode lasers as with IR ones, because visible lasers are less stable.

Moulded plastic construction is preferred because it allows the entire optical system to snap together and be automatically aligned to high precision, since the mounting surfaces have the same precision as the optical surfaces. The only exception is the laser collimator, which must also be aligned with the laser package.

The Scanning Means

The FIG. 1 scanning means 22 preferably includes a holographic scanner (hologon) 24 comprising a rotating circular disk embossed with a diffraction grating divided into radial segments. Each segment has its ruled lines running tangentially i.e., perpendicular to the radius vector at the centre of the segment. These are best operated with the beam coming in near 45 degrees to the rotation axis, and leaving near 45 degrees as well; this approximately symmetrical configuration gives a nearly rectilinear scan and minimum sensitivity to motor shaft wobble, at 80%–90% photon efficiency. The grating pitch must then be $$\approx \frac{1}{\sqrt{2}}$$

wavelengths. The scan angle is given by $$\sin \phi_{scan} = \sqrt{2} \sin \phi_{motor}$$

where motor shaft angle $\phi_{motor}$ is taken modulo $2\pi/n$, where n is the number of segments. Thus an 8-segment scanner gives a maximum scan angle of ±33° and a 12-segment one ±21°. The requirement for a nonzero beam diameter limits the scan to a somewhat smaller value, since once the segment boundary enters the beam, two output beams are produced, and so data acquisition must stop until it has crossed. A 25 mm mean diameter and a 2.2 mm beam diameter results in the loss of approximately 5° in the total scan angle, so the scan range for 8 segments is ±30.5°. It is somewhat difficult to increase the scan angle, so an increase of scanner to page distance to 9 inches to accommodate the reduced scan angle is preferable.

An advantage to the hologon scanner 24 is that the holograms can be modified somewhat to compensate for the aberrations of an objective lens 26 as a function of field angle. Although this will not vary with focal position, and so has limitations, nevertheless it helps a lot with field-flattening.

The hologon scanner 24 can provide an easy way to synchronize the motor to the scan: when the facet edge cuts the beam, two diffracted beams are produced, so a simple coincidence circuit (e.g., wiring two photodiodes in series) can provide a highly accurate synchronization signal for the phase-locked motor controller.

Frame Scanner

Figure 2:
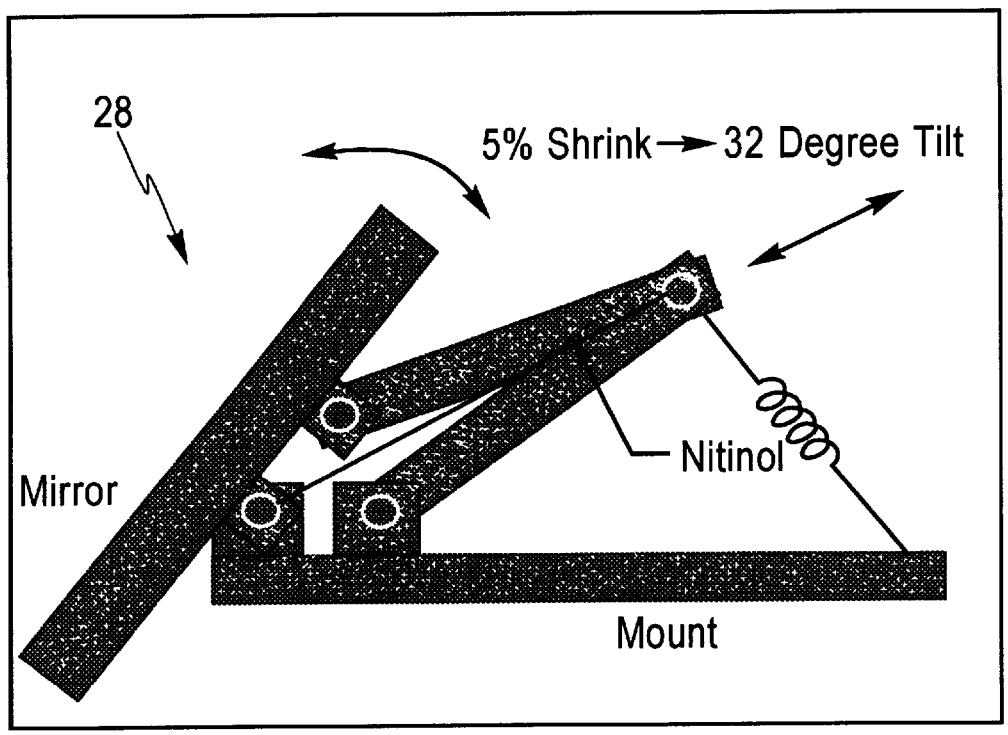
FIG. 2 shows a frame scanner utilized by the invention.

A frame scanner need not be fast, but must be very repeatable as well as extremely cheap and small. A shape memory alloy powered, scissors-type scanner 28 of FIG. 2 is a good match to the problem. The present prototype uses pinned hinges, but flexures are probably needed to get good enough repeatability, in the absence of separate encoders.

Simple Raster Scan

The scanning is done in a modified raster; a small hologon scanner e.g., (30 mm diameter) provides the line scan, and a combination of a tilting mirror and rapid tuning of the diode laser provides the frame scan. The odd scanning configuration allows short frame times. Acquiring 3000 lines of data in 500 ms, using a small hologon with 8 facets means a rotational speed of 45,000 rpm, which is not viable. Even doing the line scan along the vertical axis of the page still needs 34,000 rpm. This would use up a major fraction of the allowed battery power just in rotational kinetic energy. Going to a 5 second frame time would make it more reasonable, but would also make the hand tremor problem significantly worse.

Modified Raster

Figure 3:
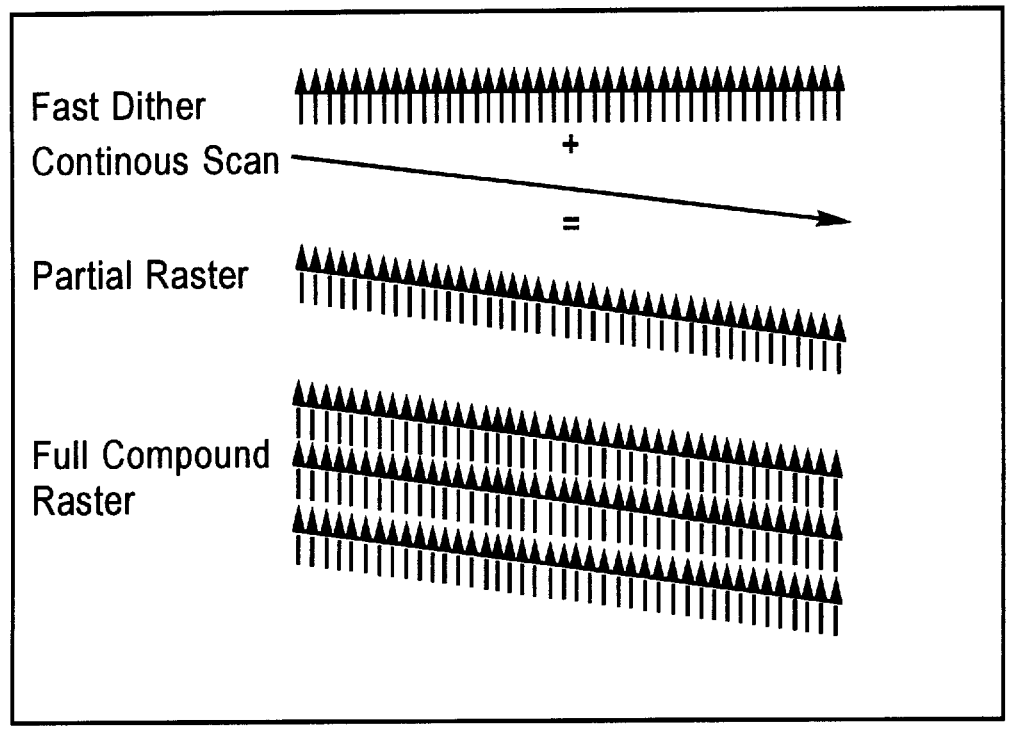
FIG. 3 illustrates a raster scan generated in accordance with principles of the present invention.

Diode lasers can be current-tuned very rapidly (1 GHz). If we can get the spot to move very rapidly 10 pels worth in the frame direction by current tuning, we can make the raster scan 10 or so times slower while not losing resolution, as shown in FIG. 3. The resulting rotation rates of 3000 rpm or so make the scanner concept feasible.

Diode lasers have a typical current tuning range of 1–2 $cm^{-1}$ (30–60 GHz) between mode hops, about $10^{-4}$ of the optical frequency v. In principle, the hologon itself could provide the angular deflection; a frequency shift $\Delta v$ will cause the hologon to deflect the beam in the frame direction by approximately $$\Delta\phi = \frac{2\Delta v}{v}$$

or around $2\times10^{-4}$ radians. This angle is a bit less than 1 pixel pitch, unfortunately. A grating with spatial frequency $k_g$ with a beam of propagation constant k incident at approximately $\theta_i$ produces an output beam whose angle and tuning sensitivity of angular deviation are $$\theta_o = \arcsin\left(\sin\theta_i \pm \frac{k_g}{k}\right)$$

$$\frac{d\theta_o}{dv} = -\frac{1}{v}\frac{k_g}{k}\frac{1}{\sqrt{1-(\sin\theta_i \pm k_g/k)^2}}$$

Figure 4:
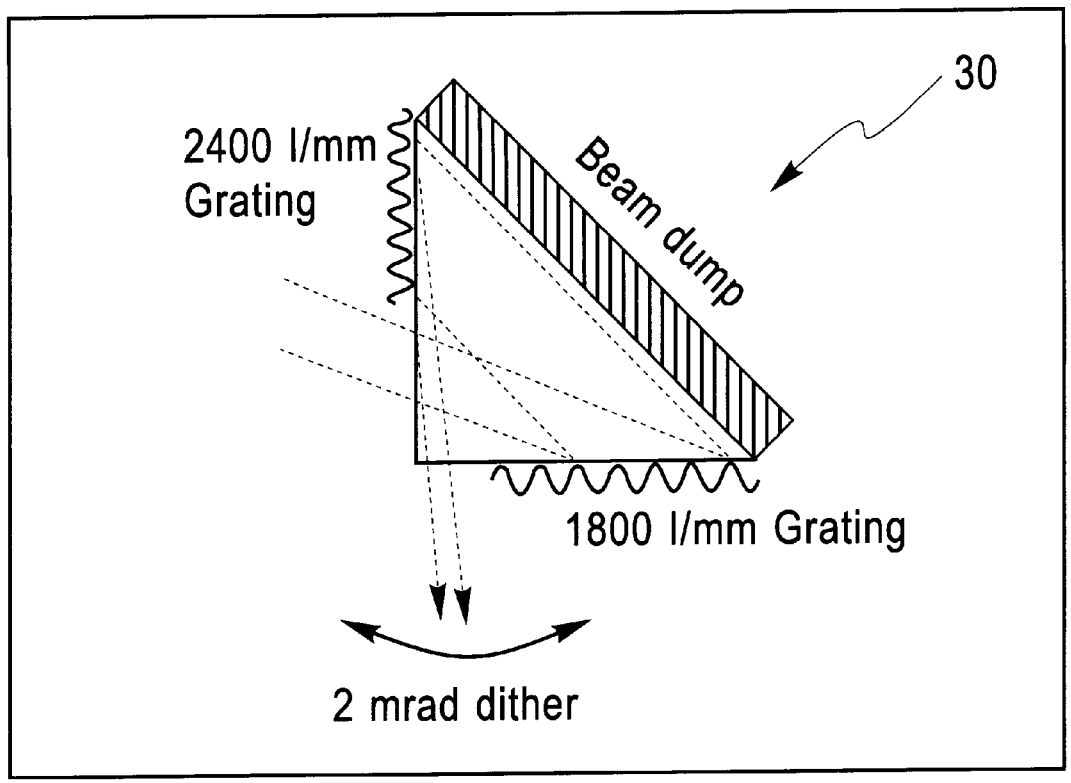
FIG. 4 shows a plate prism used in the present invention.

An auxiliary device 30 to do this is shown in FIG. 4. The device 30 comprises a small triangular plate prism (15 mm×15 mm×3 mm) made of plastic, with a grating embossed on the two legs to increase the angular range sufficiently that the focused spot will move by 8–12 pel diameters. The same device 30 can be made to serve as a beam circularizer. A factor of about 3 will be gained by circularizing the beam (where making the long dimension a factor of 3 smaller so that the angular range goes up by the same factor), an other factor of 1.6 from the refractive index of the plastic (which allows finer pitch gratings), and the rest by one bounce off each grating. The specular reflections may be controlled by placing index-matched black paint on the hypotenuse and flat sides.

One advantage of a solid prism is that when the gratings are used in air, the beam must leave the second grating near grazing incidence, where the diffraction efficiency is very low (10% for the two gratings together). Gratings placed on the surface of a plastic prism, where the anamorphic reduction and angular magnification occur at the exit face of the prism, can be used in a more efficient geometry without sacrificing angular deviation sensitivity. Simulation results show a photon efficiency of >0.6, and a resolution of 10 to 60 addressable spots, depending on geometry, grating period, and tuning range.

Lens Requirements

Hologon scanners can exhibit severe astigmatism when used with focused beams. Accordingly, the focused lens preferably must be between the hologon and the frame scan mirror, so that the lens has to run at large field angles. The line scan angle is rather less than the full field diagonal ±32° or ±25°, vs. ±38°, which is also helpful.

The hologon produces an ever so slightly curved s can line, and its scan distance is not perfectly linear in the shaft angle. A slightly variable clock speed or digital interpolation can take care of these effects.

Electrical Power Budget

The electrical power budget for the compound scanning arrangement is dominated by the mechanical scanner. Reasonable rotation rates are less than 4000 rpm, and anything beyond 50,000 rpm cannot be done even in a vacuum. Typical 30 mm hologons are about 1–1.3 mm thick, and are made of acrylic plastic with a mass density $\rho$ so their moment of inertia is $$I = \frac{\pi}{2}\rho t a^4 \approx 2.5\cdot 10^{-7} \text{kg}\cdot m^2$$

and the kinetic energy of rotation for 3300 rpm is $$E = \frac{I\omega^2}{2} = \frac{2.5\cdot 10^{-7}}{2}\cdot\left(3300\cdot\frac{2\pi}{60}\right)^2$$

If we roughly triple this for controller inefficiency, motor losses, and armature inertia, we get about 45 mJ to spin the hologon up.

Without the compound scanning arrangement, the motor would have to run 10 to 60 times faster for the same frame rate (33000 to 200000 rpm), which multiplies the kinetic energy by 100 to 3600 times, and the power requirement by 1000 to 216,000 times. Such requirements are obviously impractical, so such scan rates are impractical with a purely mechanical scan.

What is claimed:

1. An optical element comprising:
   a manifold having at least two independent surfaces, in which at least a portion of each independent surface is selected from the group consisting of a reflective structure and a diffractive structure other than a hologram, and
   wherein the independent surfaces are geometrically configured so that a portion of incident radiation to the manifold is diffracted at least twice in an angular sense that increases a rate of change of an angular deviation of the incident radiation exiting the manifold with respect to optical frequency,
   wherein a diffractive structure of one of said independent surfaces is different from that of another of said independent surfaces.

2. An optical element according to claim 1, wherein the manifold comprises a prism.

3. An optical element according to claim 2, wherein the prism comprises first and second independent surfaces of which at least a portion of each comprises a diffractive structure.

4. An optical element according to claim 3, wherein the diffractive structures are plane diffraction gratings of uniform pitch.

5. An optical element according to claim 3, wherein the diffractive structures are applied to the outside of the surfaces.

6. An optical element according to claim 2, wherein the two surfaces are adjacent.

7. An optical element according to claim 1, wherein a first surface enables radiation to enter the manifold and a second surface enables radiation to exit the manifold.

8. An optical element according to claim 1, wherein a third independent surface comprises an absorptive portion.

9. The optical element of claim 1, wherein said optical element comprises a hand-held optical element.

10. The optical element of claim 1, wherein said diffractive structure includes one of a ruled plane grating and a replica thereof.

11. An optical assembly comprising:
   (1) a tunable source of input radiation;
   (2) an optical element that receives at least a portion of the input radiation and comprises:

a manifold having at least two independent surfaces, in which at least a portion of each independent surface is selected from the group consisting of a reflective structure and a diffractive structure other than a hologram, and the independent surfaces are geometrically configured so that a portion of incident radiation to the manifold is diffracted at least twice in an angular sense that increases a rate of change of an angular deviation of the incident radiation exiting the manifold with respect to optical frequency; and (3) a scanner which accepts and redirects a portion of the radiation output by the optical element for producing an illumination pattern, wherein a diffractive structure of one of said independent surfaces is different from that of another of said independent surfaces.

12. The optical assembly of claim 11, wherein said optical element comprises a hand-held optical element.

13. The optical assembly of claim 11, wherein said diffractive structure includes one of a ruled plane grating and a replica thereof.

14. A method for scanning a radiation beam, the method comprising:

(1) providing an optical element, the optical element comprising:
  a manifold having at least two independent surfaces, in which at least a portion of each independent surface is selected from the group consisting of a reflective structure and a diffractive structure other than a hologram, and the independent surfaces are geometrically configured so that a portion of incident radiation to the manifold is diffracted at least twice in an angular sense that increases a rate of change of an angular deviation of the incident radiation exiting the manifold with respect to optical frequency; and (2) directing toward the optical element a tunable source of input radiation so that radiation output from the optical element scans in angle as the source is tuned, wherein a diffractive structure of one of said independent surfaces is different from that of another of said independent surfaces.

15. A method according to claim 14, further comprising directing the radiation output from the optical element into a scanner for producing an illumination pattern.

16. The method of claim 15, wherein said optical element comprises a hand-held optical element, wherein one of said independent surfaces has a diffraction grating of 2400 lines/mm and another of said independent surfaces has a diffraction grating of 1800 lines/mm, and wherein said diffractive structure includes one of a ruled plane grating and a replica thereof.

17. An optical element comprising:

a manifold having at least two independent surfaces, in which at least a portion of each independent surface is selected from the group consisting of a reflective structure and a diffractive structure other than a hologram, and wherein the independent surfaces are geometrically configured so that a portion of incident radiation to the manifold is diffracted at least twice in an angular sense that increases a rate of change of an angular deviation of the incident radiation exiting the manifold with respect to optical frequency, wherein one of said independent surfaces has a diffraction grating of 2400 lines/mm and another of said independent surfaces has a diffraction grating of 1800 lines/mm.

18. An optical assembly comprising:

(1) a tunable source of input radiation, (2) an optical element that receives at least a portion of the input radiation and comprises:

a manifold having at least two independent surfaces, in which at least a portion of each independent surface is selected from the group consisting of a reflective structure and a diffractive structure other than a hologram, and the independent surfaces are geometrically configured so that a portion of incident radiation to the manifold is diffracted at least twice in an angular sense that increases a rate of change of an angular deviation of the incident radiation exiting the manifold with respect to optical frequency; and (3) a scanner which accepts and redirects a portion of the radiation output by the optical element for producing an illumination pattern, wherein one of said independent surfaces has a diffraction grating of 2400 lines/mm and another of said independent surfaces has a diffraction grating of 1800 lines/mm.

* * * * *